United States Patent
Fan et al.

(10) Patent No.: US 11,223,834 B2
(45) Date of Patent: Jan. 11, 2022

(54) METHOD FOR INTRA REFRESH ENCODING OF A PLURALITY OF IMAGE FRAMES USING CONVEX AND CONCAVE DISTRIBUTION FUNCTIONS

(71) Applicant: Axis AB, Lund (SE)

(72) Inventors: Xing Danielsson Fan, Lund (SE); Maya Shah, Lund (SE); Mattias Pettersson, Lund (SE); Adam Schill Collberg, Lund (SE); Fredrik Pihl, Lund (SE); Magnus Söderdahl, Lund (SE); Peter Wilhelmsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/069,921

(22) Filed: Oct. 14, 2020

(65) Prior Publication Data

US 2021/0168379 A1    Jun. 3, 2021

(51) Int. Cl.
| | |
|---|---|
| *H04N 7/12* | (2006.01) |
| *H04N 19/176* | (2014.01) |
| *H04N 19/172* | (2014.01) |
| *H04N 19/593* | (2014.01) |
| *H04N 19/61* | (2014.01) |

(52) U.S. Cl.
CPC ......... *H04N 19/176* (2014.11); *H04N 19/172* (2014.11); *H04N 19/593* (2014.11); *H04N 19/61* (2014.11)

(58) Field of Classification Search
CPC .. H04N 19/176; H04N 19/172; H04N 19/593; H04N 19/61; H04N 19/119; H04N 19/107; H04N 19/167; H04N 19/42

USPC .................................................. 375/240.12
See application file for complete search history.

(56) References Cited

U.S. PATENT DOCUMENTS

| | | |
|---|---|---|
| 6,842,484 B2 | 1/2005 | Gandhi et al. |
| 2003/0016754 A1 | 1/2003 | Gandhi et al. |
| 2004/0076332 A1* | 4/2004 | Lin ..................... H04N 19/136 382/236 |
| 2005/0175090 A1 | 8/2005 | Vetro et al. |
| 2005/0175109 A1* | 8/2005 | Vetro ................... H04N 19/147 375/240.28 |
| 2006/0078051 A1 | 4/2006 | Liang et al. |
| 2007/0047650 A1* | 3/2007 | Vilei .................... H04N 19/172 375/240.16 |

(Continued)

FOREIGN PATENT DOCUMENTS

| | | |
|---|---|---|
| EP | 1805997 A2 | 7/2007 |
| EP | 3021583 A1 | 5/2016 |

(Continued)

OTHER PUBLICATIONS

Extended European Search Report dated Apr. 6, 2020 for the European Patent Application No. 19212375.0.

(Continued)

*Primary Examiner* — Gims S Philippe
(74) *Attorney, Agent, or Firm* — Volpe Koenig

(57) ABSTRACT

Video encoding, and specifically to a method and an encoder which can adapt the probability of intra refresh of image frame subdivisions based on a count of image frames since a previous refresh and modulated through convex or concave shaped distribution functions are set forth herein.

13 Claims, 11 Drawing Sheets

(56) References Cited

U.S. PATENT DOCUMENTS

| | | | |
|---|---|---|---|
| 2007/0074266 A1* | 3/2007 | Raveendran | H04N 19/36 |
| | | | 725/135 |
| 2007/0177667 A1* | 8/2007 | Subramania | H04N 19/182 |
| | | | 375/240.12 |
| 2007/0177678 A1* | 8/2007 | Subramania | H04N 19/176 |
| | | | 375/240.27 |
| 2010/0128788 A1 | 5/2010 | Moccagatta et al. | |
| 2015/0049801 A1 | 2/2015 | Kwon et al. | |
| 2017/0064300 A1 | 3/2017 | Yang et al. | |
| 2020/0241634 A1* | 7/2020 | Iyer | H04N 19/17 |

FOREIGN PATENT DOCUMENTS

| | | |
|---|---|---|
| KR | 10-2005-0004473 A | 1/2005 |
| WO | 2006/042323 A2 | 4/2006 |

OTHER PUBLICATIONS

Kazui, JVET-M0197 "AHG14: Software for ultra low-latency encoding", Fujitsu, (2019).

Chen et al., "Attention-based adaptive intra refresh for error-prone video transmission," in IEEE Communications Magazine, vol. 45, No. 1, pp. 52-60, (Jan. 2007).

* cited by examiner

METHOD FOR INTRA REFRESH ENCODING OF A PLURALITY OF IMAGE FRAMES USING CONVEX AND CONCAVE DISTRIBUTION FUNCTIONS

TECHNICAL FIELD

The present invention relates to video encoding and specifically to a method and an encoder which can adapt the probability of intra refresh of image frame subdivisions based on a count of image frames since a previous refresh and modulated through convex or concave shaped distribution functions.

BACKGROUND

A common problem with H.264 encoding, and other compression standards utilizing inter frame prediction, is the I-frame bit rate spike. This problem is often worse for surveillance cameras since a vast number of cameras may exist on the same network and since a typical surveillance scene has a very large (×10-×100) I-frame vs P-frame size ratio. Ideally, the network would prefer a constant bit rate.

One solution to reduce the bit rate spike for a camera is to spread the I-frame over a plurality of image frames and instead have a part (intra refresh region) of each image frame forced to be encoded as I-blocks. The intra refresh region is moved across the image frame over a set of image frames, thereby "refreshing" the image. This method is called periodic intra refresh or just intra refresh.

Intra refresh encoding can achieve a relatively smooth bit rate and terminate or reduce the error propagation caused by the transmission loss. A high rate of intra refresh is preferable for detection of events and retaining the fine details in a video stream. However, a higher refresh rate also comes with a higher bit rate requirement. Another concern of utilizing intra refresh encoding, as well as full frame refresh encoding (e.g. intra frame encoding), is that the bit rate is typically evenly distributed over the entire image frame, and not according to region of interest (ROI).

There is thus room for improvement within the technical field.

SUMMARY

Providing improved ways of intra refresh encoding and, in particular, providing methods, encoders, software, and monitoring systems with improvements to intra refresh encoding that is ROI dependent in its bit rate allocation would be beneficial.

According to a first aspect, there is provided a method for intra refresh encoding of a sequence of image frames of a video stream. The method comprises determining a plurality of distribution functions. Within the plurality of distribution functions, each distribution function defines a probability of intra refresh of a processing unit of an image frame in the video stream with respect to a number of frames that have passed since a spatially corresponding processing unit of a previous image frame in the video stream was intra refreshed. A first distribution function of the plurality of distribution functions corresponds to a cumulative distribution function having a convex shape. A second distribution function of the plurality of distribution functions corresponds to a cumulative distribution function having a concave shape.

The method further comprises receiving an image frame comprised in the video stream.

For each processing unit in the received image frame, the method further comprises:
  Determining a frame count defining how many image frames that have passed in the video stream since a spatially corresponding processing unit of a previous image in the video stream was intra refreshed.
  Determining whether the processing unit corresponds to a high relevance area or a low relevance area of the image frame.
  Upon determining that the processing unit corresponds to a high relevance area, applying the first distribution function in respect to the determined frame count to determine whether the processing unit should be intra refreshed.
  Upon determining that the processing unit corresponds to a low relevance area, applying the second distribution function in respect to the determined frame count to determine whether the processing unit should be intra refreshed.
  Intra encoding the processing unit of the received image frame if the processing unit is determined to be intra refreshed.

Intra encoding or intra frame encoding refers to exploiting spatial redundancy of pixels in a digital image frame, e.g. by comparison of color with adjacent or nearby pixels. The term intra frame coding refers to the fact that the various lossless and lossy compression techniques are performed relative to information that is contained only within the current frame, and not relative to any other frame in the video sequence.

For encoding, or by an encoder, image frames may be subdivided into a plurality of processing units. A processing unit may generally comprise a plurality of pixels. Examples of alternate nomenclature for processing units e.g. include group of pixels macroblocks (MB), block of pixels (BOP), coding tree units, and superblocks. The image frame may be subdivided into a number of equally sized processing units. Processing units may also vary in size across the image frame. Processing units may spatially correspond to previous and subsequent frames in a video stream. By this it may be understood that processing units may partially overlap, fully overlap, remain static, or at least remain in the same spatial area of the image frame for subsequent image frames. Processing units may change in size and position between subsequent image frames e.g. to follow a moving object in a video stream or to account for the movement of a source device capturing the video stream.

ROI detection/determination relates to detection and classification of different spatial areas or processing units of an image frame according to how relevant said areas might be for an observer. How relevance is determined, and the criteria used for this, may vary with the application. One encoding method that utilizes ROI detection is the Zipstream algorithm provided by Axis Communications. Parts of this algorithm are for example described in the European patent application with number EP3021583, hereby incorporated by reference. The Zipstream algorithm weighs spatial aspects such as pixel redundancy and temporal aspects such as movement of depicted objects between frames.

Relevance of areas in an image frame may be determined by quantitative or qualitative comparison with a ROI threshold. The threshold may be used to divide the image frame into e.g. high, low, and medium relevance areas.

A number of frames or frame count refers to a number of frames in the video stream since the spatial area, e.g. processing unit, of the image frame was last intra refreshed (i.e. forced to be intra encoded).

A cumulative distribution function (CDF) outputs a value from 0 to 1 corresponding to a 0 to 100% probability that an event will occur for certain input values. In the present application the event is whether a processing unit of an image frame should be intra refreshed and the input values are the count of frames since the spatial area of the image frame or corresponding processing unit was last intra refreshed.

By convex and concave shapes, it is implied that the CDF curve has either a negative second derivative for the convex case or a positive second derivative for the concave case. The CDF may be considered convex or concave if its either partially or entirely convex or concave respectively. An example of a convex CDF is the exponential distribution CDF which is entirely convex. An example of an at least partially concave CDF is the normal distribution CDF which is initially (starting from origo) concave before it turns convex and flattens out before reaching 100% probability. It may be understood that other mathematical functions that result in convex or concave probability may be used in addition to the CDF examples discussed herein. The distribution functions could also be defined by lookup-tables not necessarily based on mathematical functions. Since the x-axis of the curve corresponds to frames in discreet steps, a table may not need more individual values than the longest acceptable intra refresh rate.

Application of the first distribution function, being substantially convex, to high relevance areas of the image frame, may increase the probability of intra refresh, even at low frame counts. This preserves video stream quality where it is most relevant, allowing for better retention of interesting details in the frames. In other words, processing units in a high relevance area will be intra refreshed relatively more often.

Application of the second distribution function, being substantially concave, to low relevance areas of the image frame, may decrease the probability of intra refresh. This conserves the bit rate use so that it may be used for other data such as e.g. the high relevance areas. The second distribution function will eventually also reach higher probabilities of intra refresh after a certain number of frames have passed, assuring that the low relevance areas do not freeze, but eventually and predictably refresh.

Advantageously, the present embodiment also facilitates low complexity adjustment of the bit rate to match the bit rate capacity of a data transmission channel or otherwise set bit rate requirement.

Moreover, for the case where a relevance of corresponding processing unit changes between image frames, the present embodiment allows for a low complexity transfer between intra refresh probabilities of a processing unit.

According to some embodiments, the first distribution function defines a 100% probability of intra refresh of a processing unit after a first threshold number of frames. The second distribution function defines a 100% probability of intra refresh of a processing unit after a second threshold number of frames. The first threshold number of frames is lower than the second threshold number of frames.

Such embodiments provide reliability, flexibility and predictability to the intra refresh process by essentially configuring the distribution function curves to reach 100% probability of intra refresh at a preset threshold value. Advantageously, the CDFs are adjustable to meet a bit rate requirement, while also providing intra refresh of high relevance areas at a sufficient rate. The average refresh rate of low relevance areas may thus be kept high without sacrificing the high relevance areas.

According to some embodiments the first distribution function defines a 100% probability of intra refresh of a processing unit after a first threshold number of frames. The second distribution function defines a 100% probability of intra refresh of a processing unit after a second threshold number of frames. The first threshold number of frames is equal to the second threshold number of frames.

Such embodiments ensure that both low and high relevance processing units may have a common number of frames after which they will always intra refresh at the latest. One advantage of this embodiment is that the video may be updated at the lowest refresh rates roughly corresponding to a group of pictures (GOP) length. Thus, when trying to load a specific image frame, the number of previous image frames that must be loaded is kept lower. This is particularly useful when scrubbing (data scrubbing, memory scrubbing) in a recorded video stream.

According to some embodiments the method further comprises the step of receiving a ratio between low relevance areas and high relevance areas for an image frame in the video stream. The first and second distribution functions may be determined in view of the received ratio.

The ratio may e.g. be a ratio between the number of high relevance areas and the number of low relevance areas in the current image frame. Such embodiments allow for efficient distribution of bit rate. By this embodiment it is possible to achieve a balanced or consistent bit rate that does not substantially change but rather distributes the available bit rate resources optimally within each image frame.

According to some embodiments the first and second distribution functions are configured such that, on average, a substantially equal number of processing units are determined to be intra refreshed for each image frame of the video stream.

An equal number of processing unit being intra refreshed per image frame may substantially correlate with achieving a stable bit rate that does not fluctuate significantly. This may be achieved by e.g. altering values for defining the shape/gradient of the first and second distribution functions as well as tuning any threshold number of frames where the CDFs defines a 100% probability of intra refresh of a processing unit.

According to some embodiments the plurality of distribution functions comprises a third distribution function being a cumulative distribution function having a linear shape. The method then further comprises for each processing unit in the received image frame:
Determining whether the processing unit corresponds to a medium relevance area of the image frame.
Upon determining that the processing unit corresponds to a medium relevance area, applying the third distribution function in respect to the determined frame count to determine whether the processing unit should be intra refreshed.

Such a middle ground between low and high relevance areas may provide more flexibility for encoding as more than two relevance levels of ROI classification may be used to optimize or balance the bit rate usage.

According to some embodiments the method further comprises the step of, for each image frame of the video stream, receiving data indicating a relevance level of each processing unit in the image frame.

These embodiments may essentially facilitate a distributed implementation architecture for updating the relevance levels. The calculation of the relevance levels may thus be performed by a separate device or unit.

According to some embodiments the method further comprises, for each image frame of the video stream, the steps of:

Calculating a sum, a mean, or a median of pixel values in the processing unit to form a group value for the processing unit.

Calculating differences between group values of spatially neighboring processing units in the image frame, to associate each processing unit with a difference value.

Determining a relevance level of each processing unit in the image frame by comparing the associated difference value to a predetermined threshold value. If said difference value is equal to or above said threshold value, the processing unit is identified as corresponding to a high relevance area. Alternatively, if said difference value is below said threshold value, the processing unit is identified as corresponding to a low relevance area.

Such embodiments provide that characteristics of the pixels in a processing unit, e.g. mean values for their color, brightness or contrast, may be used to determine the relevance level of the processing unit.

According to some embodiments the method further comprises, for each image frame of the video stream, the steps of:

Calculating a sum, a mean, or a median of pixel values in the processing unit to form a group value for the processing unit.

Calculating differences between group values of spatially neighboring processing units in the image frame, to associate each processing unit with a difference value.

Determining a relevance level of each processing unit in the image frame by comparing the associated difference value to a first and second predetermined threshold value. If said difference value is equal to or above the first threshold value, the processing unit is identified as corresponding to a high relevance area. Alternatively, if said difference value is between the first threshold value and second threshold value, the processing unit is identified as corresponding to a medium relevance area. Further alternatively, if said difference value is below the first threshold value and second threshold value, the processing unit is identified as corresponding to a low relevance area.

Such embodiments entail similar advantages as the characteristics of the pixels in a processing unit, e.g. mean values for their color, brightness or contrast, may be used to determine the relevance level of the processing unit, however now with a larger number of relevance levels being accessible. A more fine-grained intra refresh rate of different areas in the image is thus achieved.

According to some embodiments a processing unit of an image frame consists of one or more macroblocks, coding tree units or superblocks.

This may be advantageous as these types of processing units may be compatible with many video stream formats and encoding methods.

According to some embodiments the video stream comprises a first and a second, immediately subsequent, image frames. For the first image frame, a first processing unit is determined to correspond to a high relevance area. For the first processing unit, the first distribution function is applied to determine whether the first processing unit should be intra refreshed. For the second image frame, a second processing unit spatially corresponding to the first processing unit is determined to correspond to a low relevance area, wherein for the second processing unit, the second distribution function is applied to determine whether the second processing unit should be intra refreshed.

These embodiments specify the rapid transfer between refresh probability curves for spatially corresponding processing units in subsequent image frames of a video stream. More specifically, the transfer from a convex shaped curve (first distribution function) to a concave shaped curve (second distribution function), is specified. Advantageously, the present embodiment deals with sudden changes in relevance level of spatially corresponding processing units of image frames in a low complexity and reliable way.

A further advantage of this is that the counter since last refresh may be kept even when changing between distribution functions. This ensures unnecessarily frequent refreshes during those changes can be avoided, which is good because it keeps the bit rate down. At the same time, the time between two refreshes will not become longer than stipulated by the current distribution function.

According to some embodiments, the video stream comprises a first and a second, immediately subsequent, image frames. For the first image frame, a first processing unit is determined to correspond to a low relevance area. For the first processing unit, the second distribution function is applied to determine whether the first processing unit should be intra refreshed. For the second image frame, a second processing unit spatially corresponding to the first processing unit is determined to correspond to a high relevance area. For the second processing unit, the first distribution function is applied to determine whether the second processing unit should be intra refreshed.

These embodiments also specify the rapid transfer between refresh probability curves but now the transfer is from a concave shaped curve (second distribution function) to a convex shaped curve (first distribution function). Advantageously, the present embodiment deals with sudden changes in relevance level of spatially corresponding processing units of image frames in a low complexity and reliable way.

This embodiment in particular, would be advantageous for the case when previously uninteresting parts of the video stream become relevant with a single frame update. This could e.g. be the case if all the pixel colors of the processing unit, and perhaps even adjacent processing units, change instantaneously, or if movements of objects within a spatial area of the image frames suddenly increases. Both of these occurrences may prompt the need for an immediately increased intra refresh probability in the relevant processing unit or spatial area.

According to a second aspect, there is provided a computer program product comprising a non-transitory computer-readable medium having computer code instructions stored thereon adapted to carry out the methods of the first aspect when executed by a device having processing capability.

Such a computer program product enables the methods previously provided by the first aspect and therefore entail similar advantages.

According to a third aspect, there is provided an encoder for intra refresh encoding of a sequence of image frames of a video stream. The encoder comprises circuitry configured to determine a plurality of distribution functions, each defining a probability of intra refresh of a processing unit of an image frame in the video stream with respect to a number of frames that have passed since a spatially corresponding processing unit of a previous image frame in the video stream was intra refreshed. A first distribution function of the plurality of distribution functions corresponds to a cumulative distribution function having a convex shape. A second distribution function of the plurality of distribution functions corresponds to a cumulative distribution function having a concave shape. The encoder circuitry is further configured to receive an image frame comprised in the video stream. For each processing unit in the received image frame, the encoder circuitry is further configured to:

Determine a frame count defining how many image frames that have passed in the video stream since a spatially corresponding processing unit of a previous image in the video stream was intra refreshed.

Determine whether the processing unit corresponds to a high relevance area or a low relevance area of the image frame.

Upon determining that the processing unit corresponds to a high relevance area, applying the first distribution function in respect to the determined frame count to determine whether the processing unit should be intra refreshed.

Upon determining that the processing unit corresponds to a low relevance area, applying the second distribution function in respect to the determined frame count to determine whether the processing unit should be intra refreshed.

Intra encode the processing unit of the received image frame if determined to be intra refreshed.

Such an encoder enables the methods provided by the first aspect and therefore entail similar advantages.

As understood by the skilled person, the circuitry of encoder may be embodied by one or more processors, ASICs, etc., or a combination of processors, ASICs According to a fourth aspect, there is provided a monitoring device comprising an image sensor, and an encoder according to the third aspect. The encoder is configured to continuously receive image frames captured by the image sensor.

Such monitoring devices may utilize the methods, computer program products, and encoders provided by the other aspects and may as such, entail similar advantages. In particular, the bit rate advantages are preferable for a remote monitoring device, optionally part of a monitoring system with a plurality of monitoring devices, wherein large amounts of data are recorded, by the image sensors, and then transmitted, by wire or wirelessly, to a central control station. In such a system the transmission bandwidth, and thus also the bit rate, may be limited. Unpredictable bit rate fluctuations may also be problematic, and a constant bit rate usage over time is preferable. This is even more the case for a system with a plurality of monitoring devices.

The second, third and fourth aspects may generally have the same features and advantages as the first aspect. It is further noted that the teachings herein relate to all possible combinations of features unless explicitly stated otherwise.

BRIEF DESCRIPTION OF THE DRAWINGS

The above, as well as additional objects, features and advantages, will be better understood through the following illustrative and non-limiting detailed description of preferred embodiments, with reference to the appended drawings, where the same reference numerals will be used for similar elements, wherein.

DETAILED DESCRIPTION OF EMBODIMENTS

The embodiments will now be described more fully hereinafter with reference to the accompanying drawings, in which embodiments are shown. The systems and devices disclosed herein will be described during operation.

Figure 1:
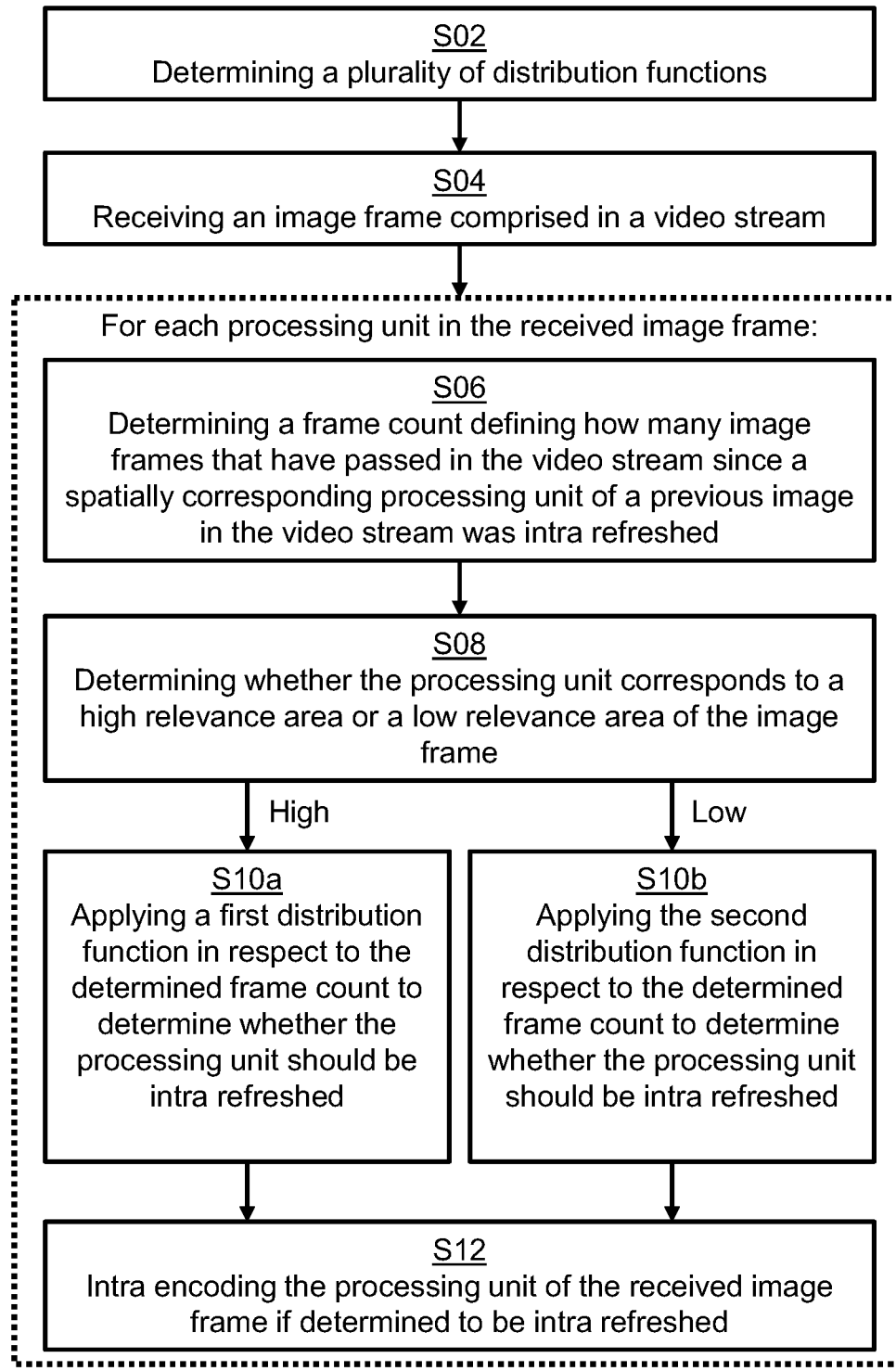
FIG. 1 shows a flow chart for a method for intra refresh encoding of image frames of a video stream, entailing applying convex and concave distribution functions to high and low relevance areas respectively, for determining whether intra refresh should be performed or not.
Figure 11:
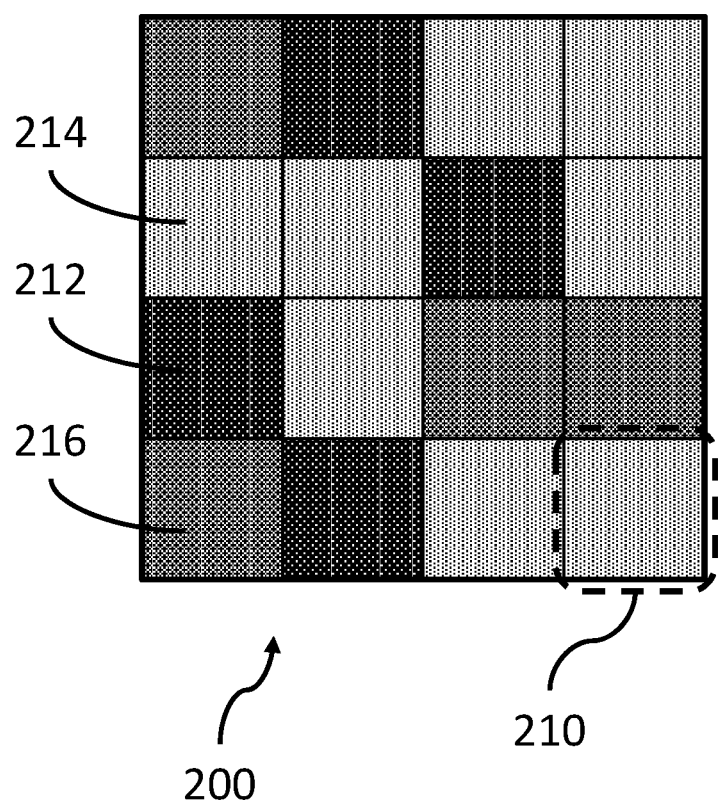
FIG. 11 shows an image frame subdivided into several processing units of high, medium, and low relevance.

FIG. 1 shows a flowchart for a method for intra refresh encoding of a sequence of image frames of a video stream. An exemplary image frame 200 is illustrated in FIG. 11. The video stream may comprise a short sequence of image frames, e.g. a few seconds long or a continuous stream, ideally without interruptions. The video stream may originate from a device with an image sensor such as a camera. The image sensor may be set up as part of a monitoring device that continuously or intermittently records a scene. As such the video stream may comprise image frames depicting the scene.

FIG. 11 shows an image frame 200 comprising at least one processing unit 210 corresponding to a spatial area of the image frame 200. In the example of the figure the image frame 200 is subdivided into equally sized, square processing units.

A second image frame (not shown) in the sequence of image frames comprises a processing unit spatially corresponding to the processing unit 210 of the first image frame 100. By this it may either be identical, i.e. in size, shape and position, or just overlap, completely or partially, with a processing unit of the first image frame. Spatial correspondence may be determined based on the pixel coordinates of the image frames. A pixel coordinate may be described on the form (x, y). The first pixel coordinate value, x, may e.g. determine the horizontal position relative to a vertical edge of the image frame and the second pixel coordinate value, y, may e.g. determine the vertical position relative to a horizontal edge of the image frame.

E.g. a rectangle from pixel (1, 1) to pixel (30, 20) may be the processing unit of the first image frame. If the processing unit of the second image frame is corresponds to a rectangle from pixel (1, 1) to pixel (30, 20), the processing units are identical. If the processing unit of the second image frame would correspond to a square from pixel (10, 10) to pixel (30, 30), it would mean that the processing units overlap each other. In both these cases, as well as others, the processing unit of the second image frame spatially corresponds to the processing unit of the first image frame.

A processing unit 210 with changing dimensions, size, and/or position may be referred to as a dynamic processing unit. Processing units may be setup to change dimensions, size and/or position over time.

With dynamic processing units, e.g. processing units 210 that can change in size, it might be relevant to keep track of when arbitrarily small parts of the image were last refreshed. In some scenarios, even individual pixels could have counters associated with them. Dynamic processing unit sizes would either mean dynamic counter area sizes or so small counter areas (such as macroblocks) that changes in processing units 210 could be accommodated.

A further implication of dynamic processing unit sizes is that different subareas of a processing unit 210 might have different number of frames since refresh. A way of handling this may be to use the highest counter within the processing unit 210. A more advanced solution may be to have the proportions between different ages affect the curve choice and/or shape.

A processing unit 210 of an image frame 200 may comprise or consist of one or more macroblocks, coding tree units or superblocks. In other words, a processing unit 210 comprise at least one group of pixels.

The method comprises the step of determining S02 a plurality of distribution functions, each defining a probability p (referred to as p in FIGS. 6-10) of intra refresh of a processing unit 210 of an image frame 200 in the video stream with respect to a number of frames fc (referred to as fc in FIGS. 6-10) that have passed since a spatially corresponding processing unit of a previous image frame in the video stream was intra refreshed. The number of frames fc, also referred to as the frame count, since the last refresh event occurred may be recorded and stored in a lookup table. The lookup table may thus comprise an indication of a latest refresh frame for each processing unit. In other words, the lookup table may thus comprise an indication, for each processing unit, of how many frames that have passed since a latest intra refresh of the processing unit.

The frame count fc may be recorded and stored per processing unit 210. The frame count fc may be recorded and stored per pixel of the image frame 200. A mean or median of the frame count fc per pixel may be calculated and used as the frame count value for the processing unit 210 or the spatial area of the image frame 200 comprising the pixels evaluated. The mean or median of the frame count fc per pixel may be used to facilitate the altering of the processing unit size or dimensions.

Alternatives to using mean/median frame counts fc could be to let the highest frame count fc be used for the whole processing unit 210. If a majority of pixels share a frame count fc, that could be used for the whole processing unit 210 without taking other frame counts fc into account.

The frame count fc may be understood as corresponding to a value of time. By dividing the frame count fc with e.g. a frames per second (FPS) value of a video stream, this time value may be calculated.

The probability of intra refresh p may be a value between 0 or 1 wherein p=0 corresponds to 0% probability of intra refresh and p=1 corresponds to 100% probability of intra refresh. The probability p may be modulated through random number generation (RNG) to output a definitive true or false state for intra refresh determination.

The frame count fc for a processing unit may be stored in a lookup table or a frame count map. As such dynamic processing unit dimensions and positions are made more viable.

Figure 6:
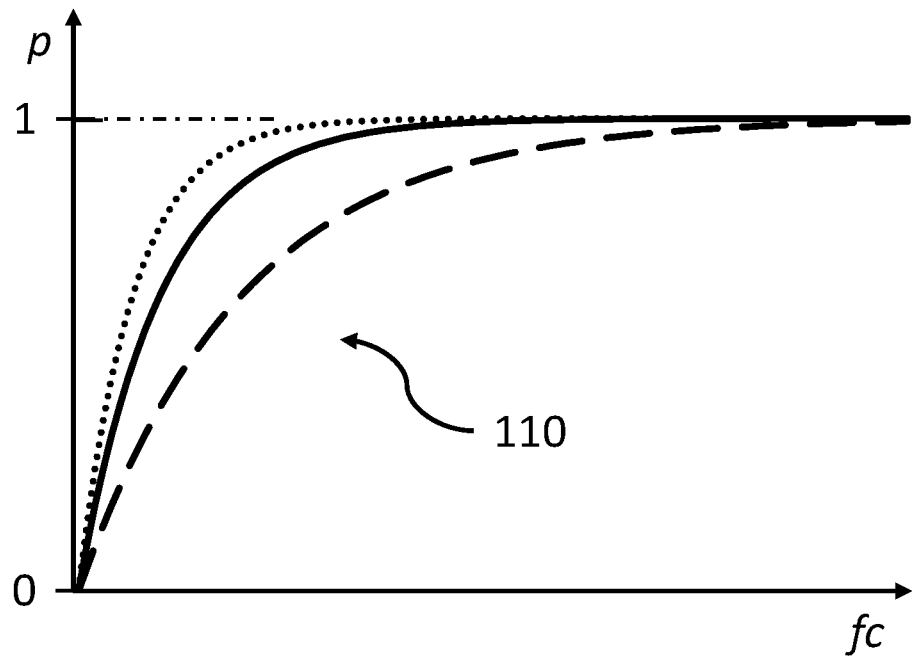
FIG. 6 shows examples of exponential distribution CDF curves with a convex shape.
Figure 7:
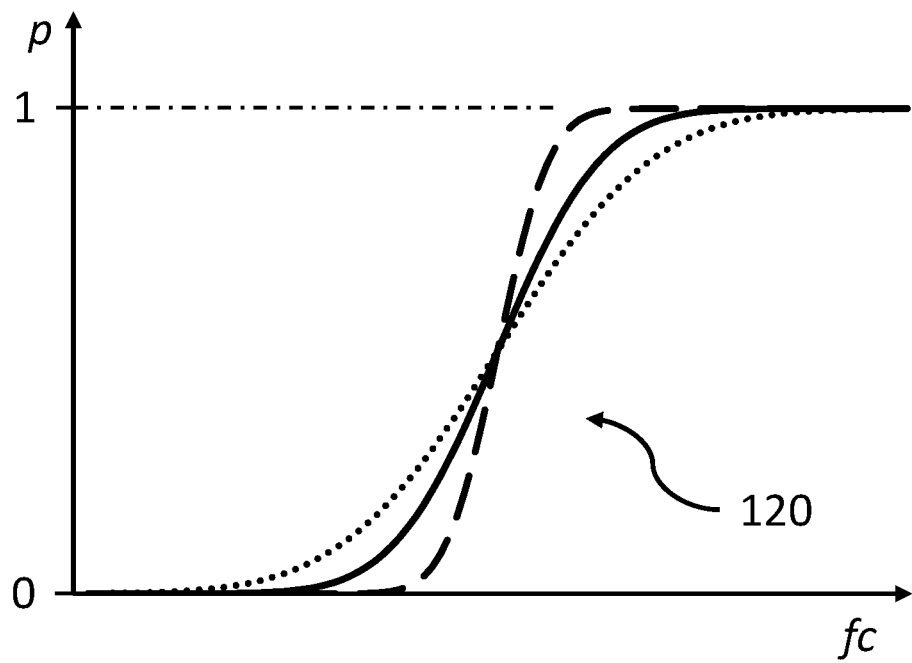
FIG. 7 shows examples of normal distribution CDF curves with both a concave and convex shape.

The plurality of distribution functions comprises a first distribution function 110 having a convex shape and a second distribution function 120 having a concave shape, exemplified in FIG. 6 and FIG. 7 respectively. The plurality of distribution functions may additionally comprise a third distribution function 130 being a cumulative distribution function having a linear shape as is illustrated by the examples in FIG. 10. The skilled person understands that the plurality of distribution functions may comprise yet further distribution functions.

The first distribution function 110 corresponds to a CDF having a convex shape. A convex shape may be described as the second derivative of first distribution function curve, with respect to frame count, having a negative value. The shape may be entirely or partially convex. The first distribution function 110 may in some embodiments correspond to at least parts of an exponential distribution CDF. FIG. 6 shows examples of exponential distribution CDF curves.

The exponential distribution CDF may be described mathematically as:

$$p = 1 - e^{\lambda fc}$$

wherein p represents the probability of intra refresh, fc represents the frame count and $\lambda$ represents an arbitrary value that defines the degree to which the curve is convex. The three curves of FIG. 6 show three CDF curves with different values for $\lambda$. The dashed line has the lowest value for $\lambda$, the dotted line has the highest value for $\lambda$, and the solid line has a value for $\lambda$ exactly in between the dashed and dotted lines values.

The second distribution function 120 of FIG. 7 corresponds to a CDF having a mostly concave shape. A concave shape may be described as the second derivative of second distribution function curve, with respect to frame count, having a positive value. The shape may be entirely or partially concave. The second distribution function 120 may in some embodiments correspond to at least parts of a normal distribution CDF.

FIG. 7 shows examples of normal distribution CDF curves that may be considered. The second distribution function 120 may be defined as part of a normal distribution CDF, e.g. the concave portions towards lower frame count fc values where the probability p approaches 0%.

The normal distribution CDF may be described mathematically as:

$$p = \frac{1}{2}\left[1 + \mathrm{erf}\left(\frac{fc - \mu}{\sigma\sqrt{2}}\right)\right]$$

wherein p represents the probability of intra refresh, fc represents the frame count, $\mu$ represents an arbitrary value corresponding to the mean of the normal distribution, and $\sigma$ represents an arbitrary value corresponding to the standard deviation of the normal distribution. The value of p may determine at what frame count the curve is centered and the value of $\sigma$ may determine the grade at which the curve is sloped, both convexly and concavely. The three curves of FIG. 7 show three CDF curves with the same value for $\mu$ but with different values for $\sigma$. The dashed line has the lowest value for a, the dotted line has the highest value for σ, and the solid line has a value for a exactly in between the dashed and dotted lines values.

Essentially any curve or function being convex, concave, or linear, in part or in its entirety, may be considered for the first, second, and third distribution functions 110, 120, 130 respectively.

The distribution functions 110, 120, 130 may be modulated before use by e.g. arbitrarily offsetting them vertically or horizontally, mirroring or flipping the curves, introducing an arbitrary factor with which the distributions are multiplied. Any combination of the above is also available.

The first distribution function 110 may define a 100% probability of intra refresh p of a processing unit 210 after a first threshold number of frames ft1. The second distribution function defines a 100% probability of intra refresh of a processing unit 210 after a second threshold number of frames ft2. The first threshold number of frames ft1 may be lower than the second threshold number of frames ft2. The first threshold number of frames ft1 may be equal to the second threshold number of frames ft2. The first threshold number of frames ft1 may also be larger than the second threshold number of frames ft2. The thresholds ft1, ft2 may be understood as corresponding to a value of time. By dividing the thresholds ft1, ft2 with e.g. a FPS value of a video stream, this time value may be calculated.

Figure 8:
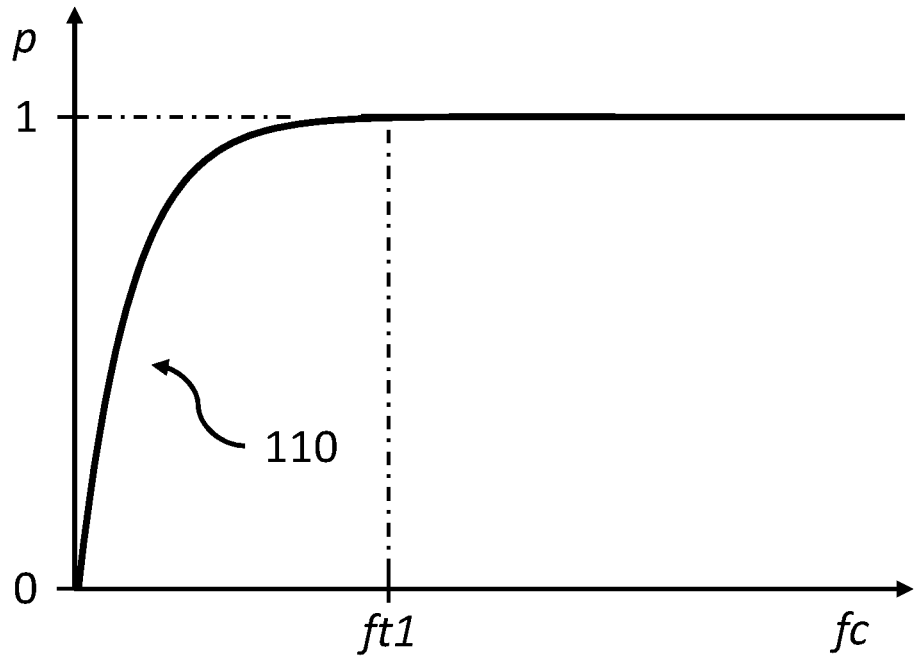
FIG. 8 shows an exponential distribution CDF curve, with a threshold.

The first threshold number of frames ft1, shown in FIG. 8, may be chosen to define the first distribution function 110 by essentially compressing or stretching the curve horizontally such that the threshold ft1 corresponds to the lowest frame count fc that at least substantially corresponds to a 100% probability of intra refresh.

Figure 9:
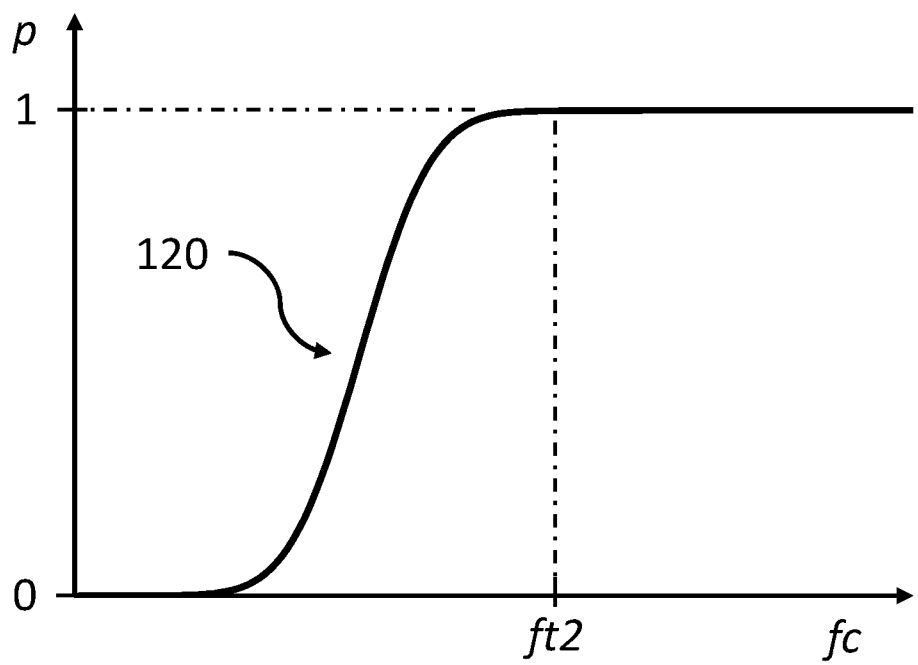
FIG. 9 shows a normal distribution CDF curve, with a threshold.
Figure 10:
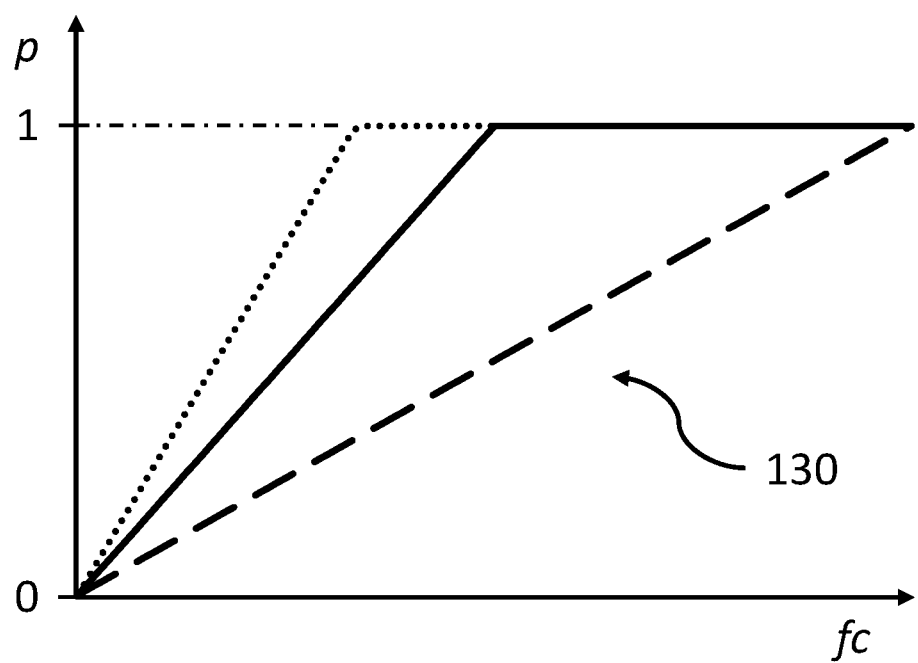
FIG. 10 shows examples of linear CDF curves.

The second threshold number of frames ft2, shown in FIG. 9, may be chosen to define the second distribution function 120 by essentially compressing or stretching the curve horizontally such that the threshold ft2 corresponds to the lowest frame count fc that at least substantially corresponds to a 100% probability of intra refresh.

Figure 13:
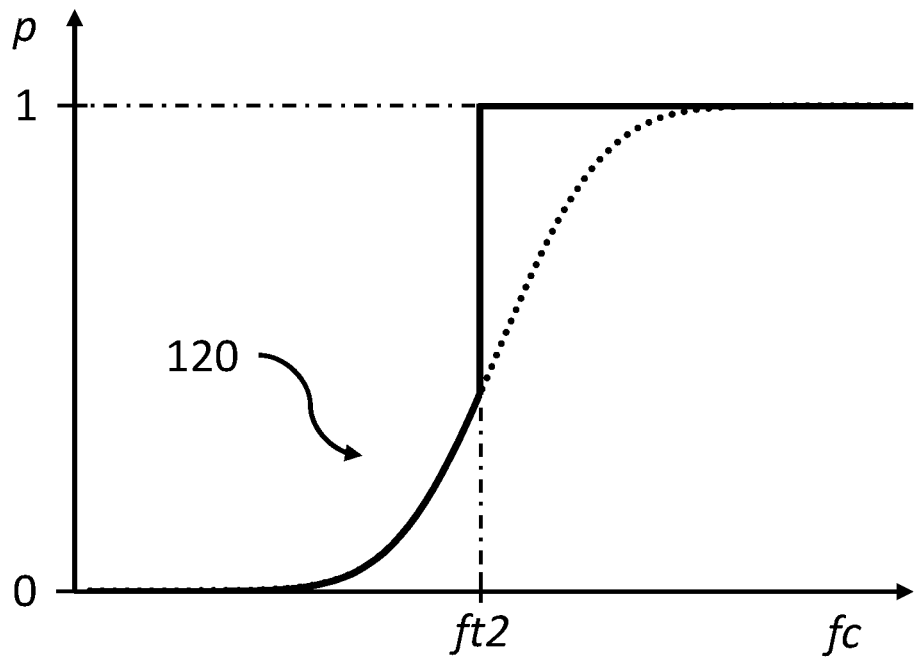
FIG. 13 shows a normal distribution CDF with a vertical cut off.

The distribution functions 110, 120, 130 may also include thresholds that replace the curve with a fixed value for the probability p, relative to the frame count fc, after reaching e.g. a specific frame count fc or probability value p. FIG. 13, showing a normal distribution CDF vertically cut off at ft2, indicates how all frame counts fc exceeding a frame count threshold may e.g. be determined to correspond to p=1, i.e. 100% probability of intra refresh.

Figure 14:
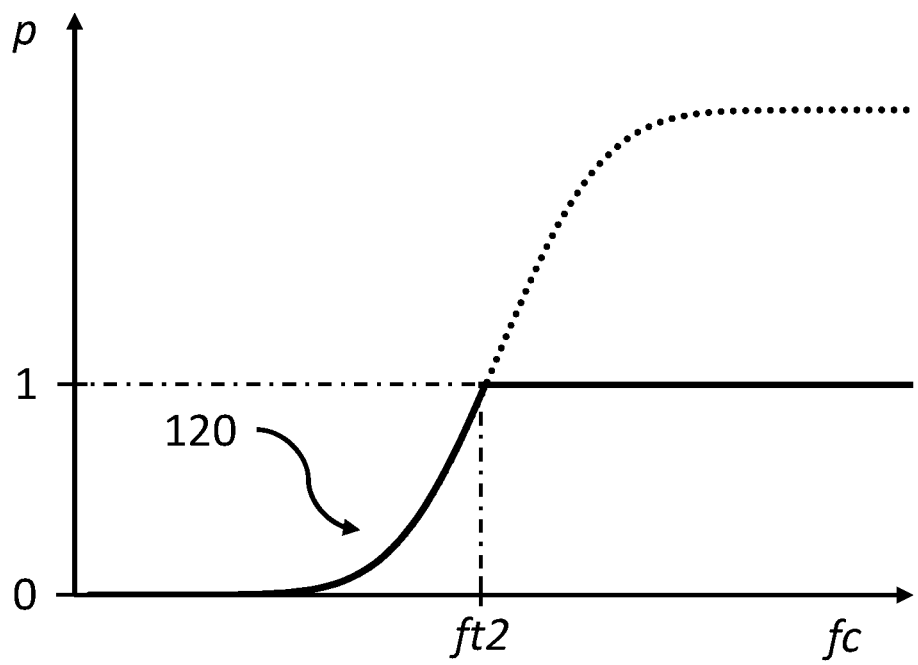
FIG. 14 shows a normal distribution CDF with a horizontal cut off

Selecting the threshold could also be accomplished by lowering the p=1 level in the above functions, as illustrated in FIG. 14, showing a similar normal distribution CDF horizontally cut off at ft2 or p=1. This may cause the curves to reach 100% probability earlier. This may also limit the curve to only be concave until reaching p=1, as opposed to the examples of FIG. 7. This may be understood as using the shape of the CDF, rather than a CDF as conventionally defined, as such a CDF may not be defined for values of p>1. The lowering of the level p=1 may be achieved by simply grading values on the p-axis in the graphs. Grading may comprise multiplying every p-value for points on the curve. Resulting values for p>1 may then be replaced with p=1, as the probability for intra refresh may not exceed 100%.

Such embodiments provide reliability and predictability to the intra refresh process by replacing the tails of the CDF curves that de facto only reach 100% probability of intra refresh after an infinite frame count has been reached.

It should be noted that the actual implementation of the distribution functions may vary. For example, each distribution function may be defined by a vector of probability values, each defining probability value defining a probability of intra refresh will be done for a processing unit depending on:

how many frames fc have passed since a spatially corresponding processing unit of a previous image frame in the video stream was intra refreshed, and relevance of the processing unit.

For example, the first distribution function 110 may be defined by the following probability vector: [0, 40, 70, 85, 93, 96, 98, 99, 100] (8 being the threshold value ft1 for the first distribution function 110).

For example, the second distribution function 120 may be defined by the following probability vector: [0, 1, 2, 4, 8, 16, 32, 64, 100] (8 being the threshold value ft2 for the second distribution function 120).

These vectors may also be graded by multiplication of all values within them with one or more grading factors. As such, the curves defined by the vectors may be compressed or elongated along the frame count fc axis, i.e. the horizontal axis of FIGS. 6-10. This method may require extrapolation of p values if the grading factor is less than 1 and/or finding an intersect point where the graded curve intersects p=1.

The skilled person understands that other mathematical approaches to modifying the vectors, and thus also the functions and curves, are possible. The numerical values used herein are merely for providing examples and the skilled person understands that other values are entirely possible.

Figure 2:
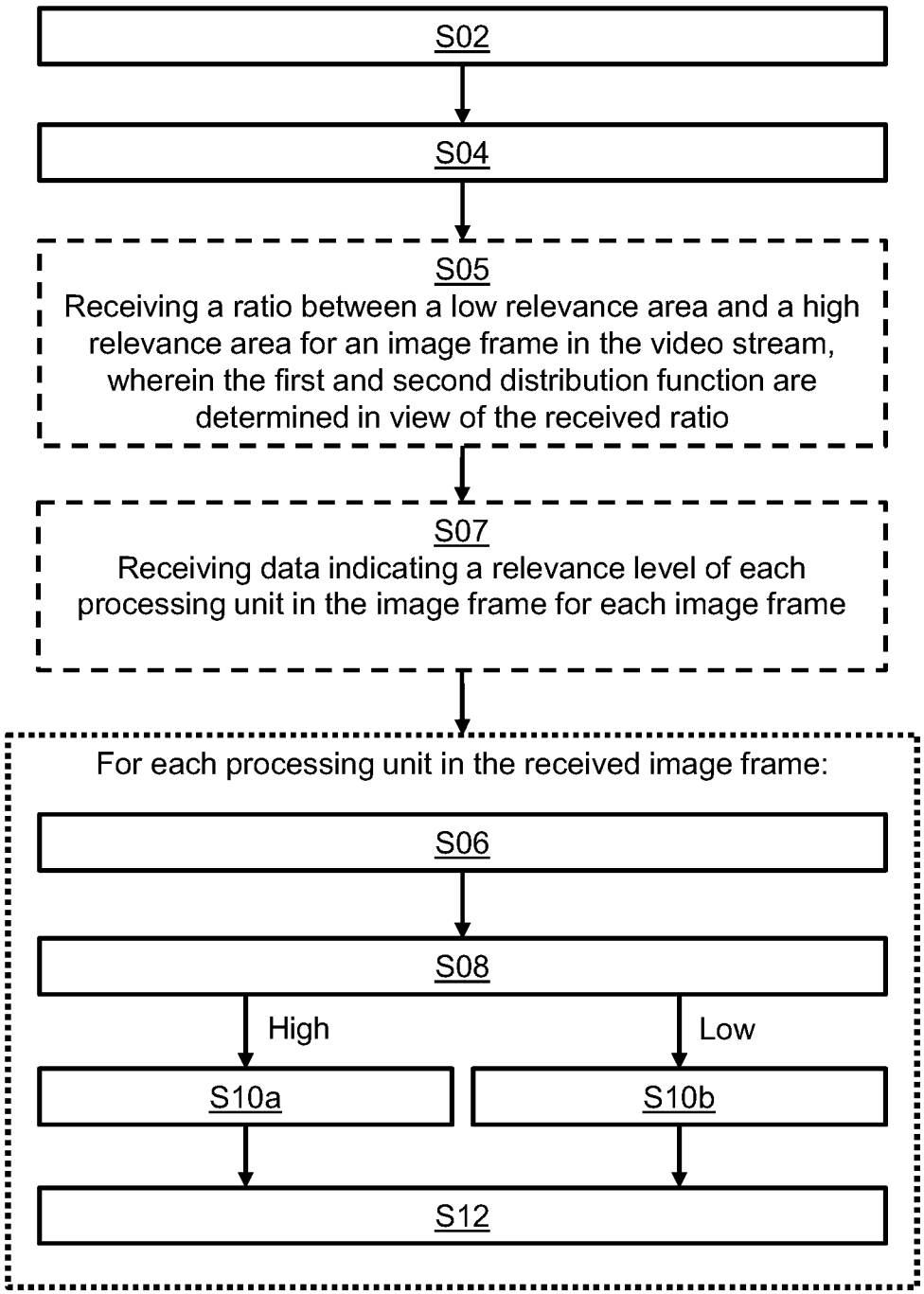
FIG. 2 shows a flow chart for a method for intra refresh encoding including the optional steps of some embodiments.

The method may further comprise the step of receiving S05 a ratio between low relevance areas 214 and high relevance areas 212 for an image frame 200 in the video stream, wherein the first and second distribution functions 110, 120 are determined in view of the received ratio. The flowchart of FIG. 2 includes this additional step. The ratio may e.g. be a ratio between the number of high relevance areas 112 and the number of low relevance areas 114 in an image frame. The ratio may alternatively relate to a ratio of the actual area coverage by the respective relevance areas. The first and second distribution functions 110, 120 may be configured such that, on average, a substantially equal number of processing units 210 are determined to be intra refreshed for each image frame 200 of the video stream. This may be achieved by modifying the distribution functions 110, 120 by e.g. multiplication with a grading factor or offsetting the curves.

The method may further comprise the step of, for each image frame 200 of the video stream, receiving S07 data indicating a relevance level of each processing unit 210 in the image frame 200. The flowchart of FIG. 2 includes this additional step. The relevance level may refer to whether the processing unit 210 or spatial area in the image frame corresponds to e.g. a high relevance area 212, a low relevance area 214 or medium relevance area 216. Further or alternate relevance levels may be considered.

The method of FIG. 1 further comprises receiving S04 an image frame 200 comprised in the video stream. For each processing unit in the received image frame 200 the method further comprises determining S06 a frame count fc defining how many image frames that have passed in the video stream since a spatially corresponding processing unit of a previous image in the video stream was intra refreshed.

For each processing unit 210 in the received image frame 200 the method further comprises determining S08 whether the processing unit 210 corresponds to a high relevance area 212 or a low relevance area 214 of the image frame 200. Upon determining that the processing unit 210 corresponds to a high relevance area 212, the method comprises applying S10a the first distribution function 110 in respect to the determined frame count fc to determine whether the processing unit 210 should be intra refreshed. Upon determining that the processing unit 210 corresponds to a low relevance area, the method comprises applying S10b the second distribution function 120 in respect to the determined frame count fc to determine whether the processing unit 210 should be intra refreshed.

Figure 3:
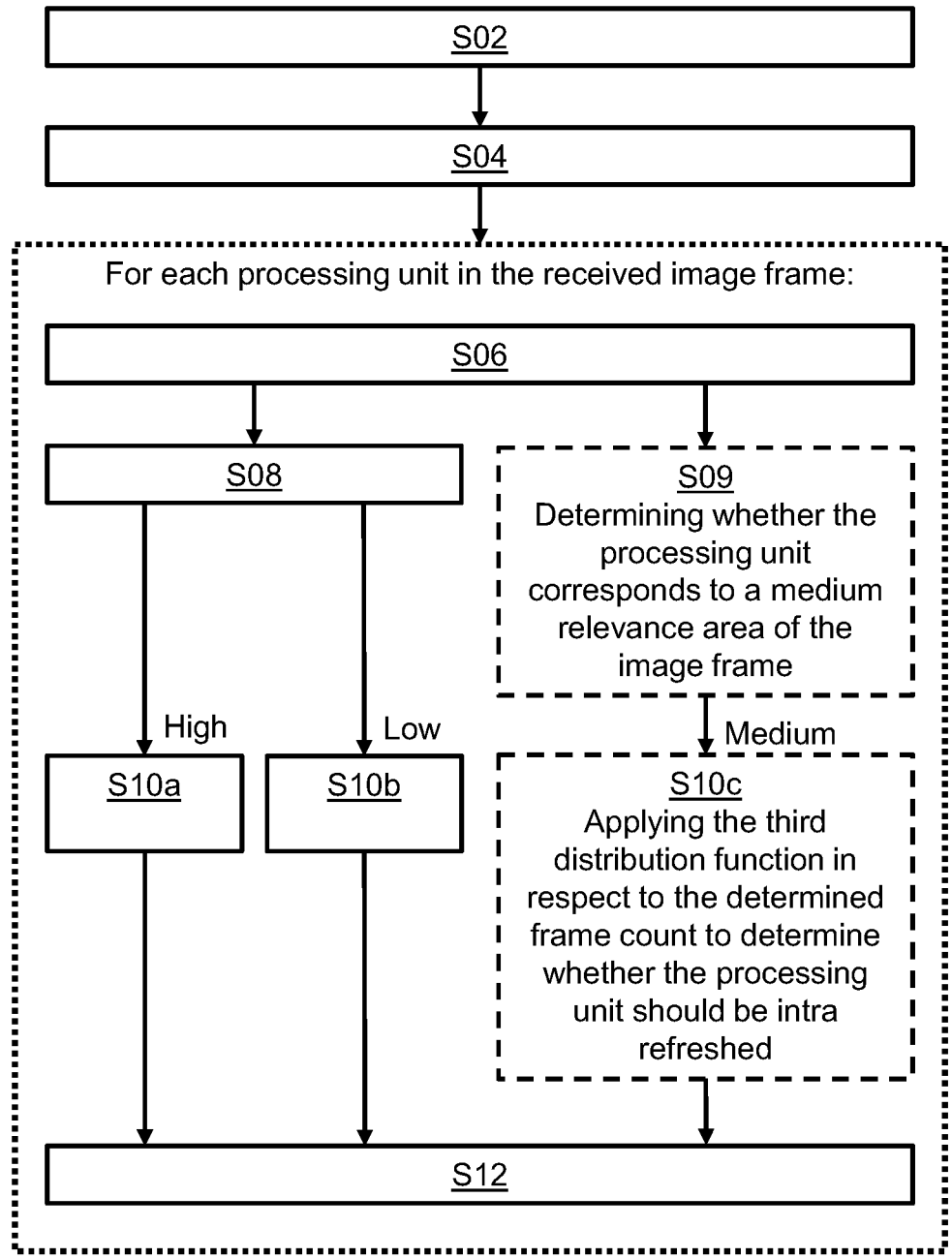
FIG. 3 shows a flow chart for a method for intra refresh encoding according to some embodiments including a third, medium, relevance level.

For each processing unit 210 in the received image frame 200 the method may further comprise determining S09 whether the processing unit corresponds to a medium relevance area 216 of the image frame 200. Upon determining that the processing unit 210 corresponds to a medium relevance area 216, the method may comprise applying S10c the third distribution function 130 in respect to the determined frame count fc to determine whether the processing unit 210 should be intra refreshed. The flowchart of FIG. 3 includes these additional steps.

By application of the first, second or third distribution functions 110, 120, 130 a probability p of intra refresh is output as a result of an input frame count fc.

Data pertaining to whether a processing unit 210, or spatially corresponding area, has been determined as a high relevance area 212 or a low relevance area 214 may be recorded and stored in a lookup table. Other grades of relevance may also exist and may be recorded and stored similarly.

Figure 4:
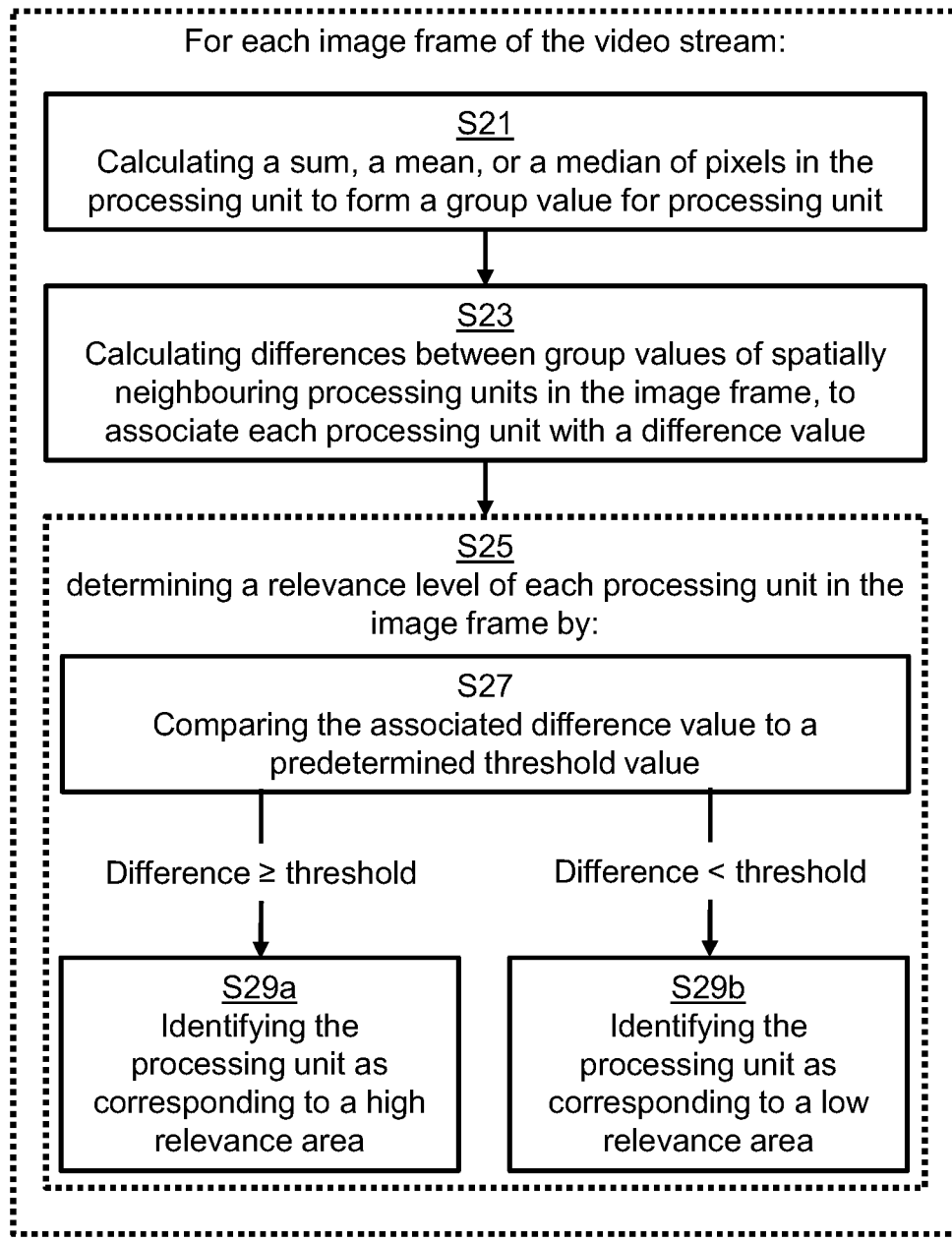
FIG. 4 shows a flow chart for a method of determining a whether a processing unit should have a high or low relevance level according to embodiments.

FIG. 4 illustrates how the method may further comprise for each image frame 200 of the video stream calculating S21 a sum, a mean, or a median of pixel values, associated with specific pixels, in the processing unit 210 to form a group value for the processing unit 210. A pixel value, i.e. a pixel specific value, may e.g. pertain to the color or brightness of the pixel. The pixel value may alternatively pertain to a contrast of the pixel relative to adjacent pixels.

FIG. 4 further illustrates how the method may further comprise calculating S23 differences between group values of spatially neighboring processing units 210 in the image frame 200, to associate each processing unit 210 with a difference value. The method may further comprise determining S25 a relevance level of each processing unit 210 in the image frame 200 by comparing S27 the associated difference value to a predetermined threshold value. If said difference value is equal to or above said threshold value, the method may further comprise identifying S29a the processing unit 210 as corresponding to a high relevance area 212. If said difference value is below said threshold value, the method may further comprise identifying S29b the processing unit 210 as corresponding to a low relevance area 214.

Figure 5:
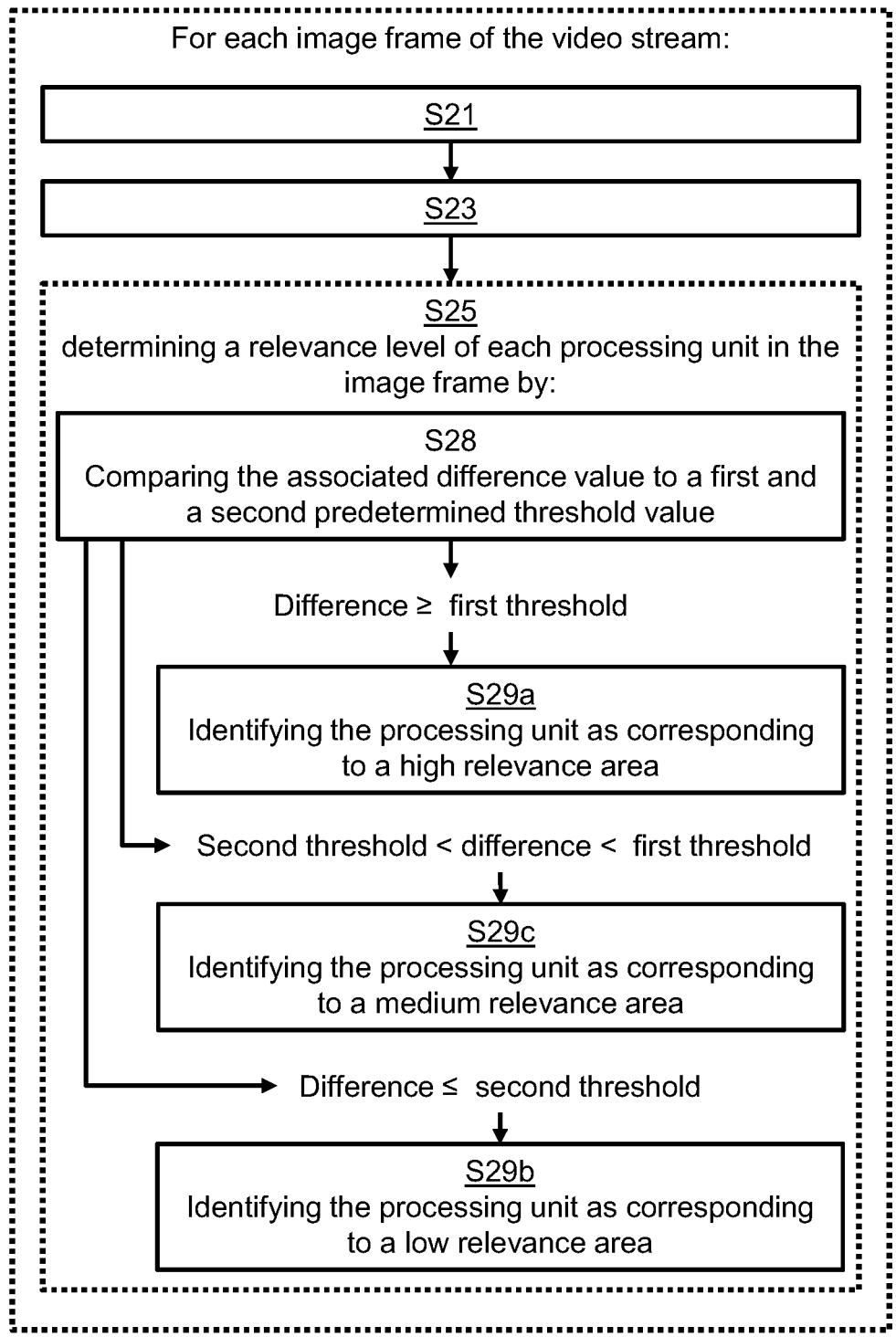
FIG. 5 shows a flows chart for a method of determining a whether a processing unit should have a high, medium, or low relevance level according to embodiments.

Alternatively, and shown in FIG. 5, the method of determining S25 a relevance level of each processing unit 210 in the image frame, may comprise comparing S28 the associated difference value to a first and second predetermined threshold value. If said difference value is equal to or above the first threshold value, the method may further comprise identifying S29a the processing unit 210 as corresponding to a high relevance area 212. If said difference value is between the first threshold value and second threshold value, the method may further comprise identifying S29c the processing unit 210 as corresponding to a medium relevance area 216. If said difference value is below the first threshold value and second threshold value, the method may further comprise identifying S29b the processing unit 210 as corresponding to a low relevance area 214.

It should be noted that any other suitable measure for determining a relevance level of a processing unit may be employed. For example, a level of motion in the respective processing unit may be used as a measurement, where a processing unit with a high level of motion (i.e. large differences in the pixel data/values of the processing unit compared to spatially corresponding processing unit(s) in previous image frames) is considered more important than a processing unit with a lower level of motion. Another example includes edge detection within each processing unit, where a processing unit comprising more edges may be considered as more relevant than a processing unit with less edges. The relevance level might be triggered or determined by an external sensor, such as a motion sensor, thermal camera, secondary camera, radar or other types of sensors.

The method of FIG. 1 further comprises, for each processing unit 210 in the received image frame 200, intra encoding S12 the processing unit of the received image frame if the processing unit is determined to be intra refreshed. Intra refresh itself may be performed in accordance with conventional intra refresh methods available to the skilled person.

The video stream may comprise a first and a second, immediately subsequent, image frames 200. For the first image frame, a first processing unit may be determined to correspond to a high relevance area 212. For the first processing unit, the first distribution function 110 may be applied to determine whether the first processing unit should be intra refreshed. For the second image frame, a second processing unit spatially corresponding to the first processing unit may be determined to correspond to a low relevance area 214. For the second processing unit, the second distribution function 120 is applied to determine whether the second processing unit should be intra refreshed.

Alternatively, for the first image frame, a first processing unit may be determined to correspond to a low relevance area 214. For the first processing unit, the second distribution function 120 may be applied to determine whether the first processing unit should be intra refreshed. For the second image frame, a second processing unit spatially corresponding to the first processing unit may be determined to correspond to a high relevance area 212. For the second processing unit, the first distribution function 110 may be applied to determine whether the second processing unit should be intra refreshed.

For example, consider the example above with the two vectors of probability values.

For the first processing unit of the first frame, a 2% probability of intra refresh is determined (it has passed two frames since the last refresh). The first processing unit is not intra refreshed in this example. For the second processing unit of the second frame, the relevance level has increased to high relevance. Consequently, for the second processing unit 85 percentage chance of intra refresh is determined (it has now passed three frames since the last refresh).

Steps of calculating, determining, comparing, applying, identifying, encoding, receiving etc. may be performed by a device with processing capability and an ability to receive data or instructions, wired or wirelessly. Such a device may e.g. be a computer or an encoder.

A computer program product comprising a non-transitory computer-readable medium having computer code instructions stored thereon may be adapted to carry out the methods provided herein, when executed by a device having processing capability.

Figure 12:
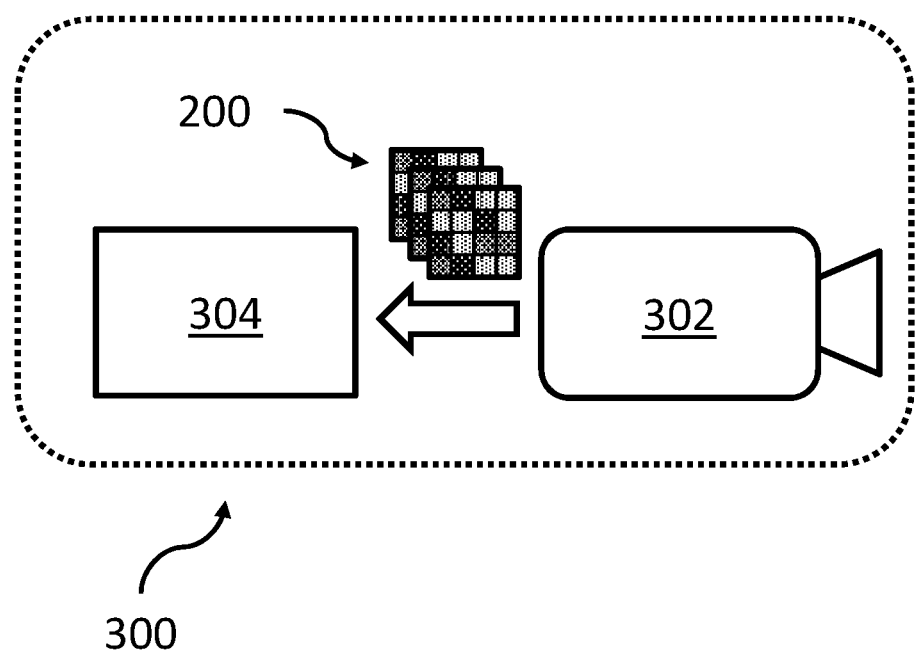
FIG. 12 schematically shows a monitoring device comprising an image sensor and an encoder.

As shown in FIG. 12, an encoder 304 for intra refresh encoding of a sequence of image frames 200 of a video stream may be provided. The encoder 304 may comprise circuitry configured to perform the methods provided herein. The encoder 304 may be a device, circuit, transducer, computer program product or algorithm that converts information from one format or code to another, for the purpose of standardization, speed or compression.

The encoder 304 may be part of a monitoring device 300, as illustrated by FIG. 12. The monitoring device 300 may further comprise an image sensor 302. The image sensor 302 may be part of a camera or video camera. The image sensor 302 may more specifically be a pan-tilt-zoom camera. The image sensor 302 may be setup to capture a video stream comprising image frames depicting a scene or a plurality of scenes.

The encoder 304 may be configured to continuously receive image frames 200 captured by the image sensor 302. The monitoring device 300, or at least the image sensor 302, may be setup to continuously or intermittently record a scene of interest for forensic, security, safety, or research purposes to name a few non-limiting examples.

Data indicating a relevance level of each processing unit may be received from an image analysis unit (peripheral or integral with the encoder 304) configured to determine such relevance levels. The image analysis unit may be also be peripheral or integral with the monitoring device 300.

The monitoring device 300, encoder 304, or the image sensor 302 may be configured to carry out the methods described herein.

The image sensor 302 and the encoder 304 may be integrally formed as a single device. The image sensor 302 and the encoder 304 may alternatively be separate and connected by wire or wirelessly.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor or be implemented as hardware or as an application-specific integrated circuit. Such software may be distributed on computer readable media, which may comprise computer storage media (or non-transitory media) and communication media (or transitory media).

In the above the aspects have mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for intra refresh encoding of a sequence of image frames of a video stream, the method comprising:
  determining a plurality of distribution functions, each defining a probability of intra refresh of a block of pixels of an image frame in the video stream with respect to a number of frames that have passed since a spatially corresponding block of pixels of a previous image frame in the video stream was intra refreshed, wherein a first distribution function of the plurality of distribution functions corresponds to a cumulative distribution function having a convex shape, wherein a second distribution function of the plurality of distribution functions corresponds to a cumulative distribution function having a concave shape,
  receiving an image frame comprised in the video stream,
  for each block of pixels in the received image frame,
    determining a frame count defining how many image frames that have passed in the video stream since a spatially corresponding block of pixels of a previous image in the video stream was intra refreshed,
    determining whether the block of pixels spatially corresponds to a region of interest, ROI, of the image frame or not,
    upon determining that the block of pixels spatially corresponds to the ROI, applying the first distribution function in respect to the determined frame count to determine whether the block of pixels should be intra refreshed,
    upon determining that the block of pixels does not spatially correspond to the ROI, applying the second distribution function in respect to the determined frame count to determine whether the block of pixels should be intra refreshed,
  intra encoding the block of pixels of the received image frame if the block of pixels is determined to be intra refreshed.

2. The method of claim 1, wherein the first distribution function defines a 100% probability of intra refresh of a block of pixels after a first threshold number of frames, wherein the second distribution function defines a 100% probability of intra refresh of a block of pixels after a second threshold number of frames, wherein the first threshold number of frames is lower than the second threshold number of frames.

3. The method of claim 1, wherein the first distribution function defines a 100% probability of intra refresh of a block of pixels after a first threshold number of frames, wherein the second distribution function defines a 100% probability of intra refresh of a block of pixels after a second threshold number of frames, wherein the first threshold number of frames is equal to the second threshold number of frames.

4. The method of claim 1, further comprising the step of receiving a ratio between the number of blocks of pixels not spatially corresponding to the ROI and the number of blocks of pixels spatially corresponding to the ROI for an image frame in the video stream, wherein the first and second distribution functions are determined in view of the received ratio.

5. The method of claim 4, wherein the first and second distribution functions are configured such that, on average, an equal number of blocks of pixels are determined to be intra refreshed for each image frame of the video stream.

6. The method of claim 1, further comprising the step of, for each image frame of the video stream, for each block of pixels in the image frame, receiving data indicating whether the block of pixels spatially corresponds to the ROI of the image frame or not.

7. The method of claim 1, further comprising the steps of:
  for each image frame of the video stream,
    for each block of pixels in the image frame, calculating a first value representing the block of pixels by calculating a sum, a mean, or a median of pixel values in the block of pixels,
    calculating differences between first values of spatially neighboring blocks of pixels in the image frame, to associate each block of pixels with a difference value,
    determining, for each block of pixels in the image frame, whether the block of pixels spatially corresponds to ROI of the image frame or not by:
      comparing the associated difference value to a predetermined threshold value, if said difference value is equal to or above said threshold value, identifying the block of pixels as spatially corresponding to the ROI, if said difference value is below said threshold value, identifying the block of pixels as not spatially corresponding to the ROI.

8. The method of claim 1, wherein a block of pixels of an image frame consists of one or more macroblocks, coding tree units or superblocks.

9. The method of claim 1, wherein the video stream comprises a first and a second, immediately subsequent, image frames, wherein, for the first image frame, a first block of pixels is determined to spatially correspond to the ROI of the first image frame, wherein for the first block of pixels, the first distribution function is applied to determine whether the first block of pixels should be intra refreshed, and wherein, for the second image frame, a second block of pixels spatially corresponding to the first block of pixels is determined to not spatially correspond to the ROI of the second image frame, wherein for the second block of pixels, the second distribution function is applied to determine whether the second block of pixels should be intra refreshed.

10. The method of claim 1, wherein the video stream comprises a first and a second, immediately subsequent, image frames, wherein, for the first image frame, a first block of pixels is determined to not spatially correspond to the ROI of the first image frame, wherein for the first block of pixels, the second distribution function is applied to determine whether the first block of pixels should be intra refreshed, and wherein, for the second image frame, a second block of pixels spatially corresponding to the first block of pixels is determined to spatially correspond to the ROI of the second image frame, wherein for the second block of pixels, the first distribution function is applied to determine whether the second block of pixels should be intra refreshed.

11. A non-transitory computer-readable medium having computer code instructions stored thereon adapted to carry out a method for intra refresh encoding of a sequence of image frames of a video stream, the method comprising:

determining a plurality of distribution functions, each defining a probability of intra refresh of a block of pixels of an image frame in the video stream with respect to a number of frames that have passed since a spatially corresponding block of pixels of a previous image frame in the video stream was intra refreshed, wherein a first distribution function of the plurality of distribution functions corresponds to a cumulative distribution function having a convex shape, wherein a second distribution function of the plurality of distribution functions corresponds to a cumulative distribution function having a concave shape, receiving an image frame comprised in the video stream, for each block of pixels in the received image frame, determining a frame count defining how many image frames that have passed in the video stream since a spatially corresponding block of pixels of a previous image in the video stream was intra refreshed, determining whether the block of pixels spatially corresponds to a region of interest, ROI, of the image frame or not, upon determining that the block of pixels spatially corresponds to the ROI, applying the first distribution function in respect to the determined frame count to determine whether the block of pixels should be intra refreshed, upon determining that the block of pixels does not spatially correspond to the ROI, applying the second distribution function in respect to the determined frame count to determine whether the block of pixels should be intra refreshed, intra encoding the block of pixels of the received image frame if the block of pixels is determined to be intra refreshed.

12. An encoder for intra refresh encoding of a sequence of image frames of a video stream, the encoder comprising circuitry configured to:

determine a plurality of distribution functions, each defining a probability of intra refresh of a block of pixels of an image frame in the video stream with respect to a number of frames that have passed since a spatially corresponding block of pixels of a previous image frame in the video stream was intra refreshed, wherein a first distribution function of the plurality of distribution functions corresponds to a cumulative distribution function having a convex shape, wherein a second distribution function of the plurality of distribution functions corresponds to a cumulative distribution function having a concave shape, receive an image frame comprised in the video stream, for each block of pixels in the received image frame, determine a frame count defining how many image frames that have passed in the video stream since a spatially corresponding block of pixels of a previous image in the video stream was intra refreshed, determine whether the block of pixels spatially corresponds to a region of interest, ROI, of the image frame or not, upon determining that the block of pixels spatially corresponds to the ROI, applying the first distribution function in respect to the determined frame count to determine whether the block of pixels should be intra refreshed, upon determining that the block of pixels does not spatially corresponds to the ROI, applying the second distribution function in respect to the determined frame count to determine whether the block of pixels should be intra refreshed, intra encode the block of pixels of the received image frame if determined to be intra refreshed.

13. A monitoring device comprising an image sensor, and an encoder according to claim 12, wherein the encoder is configured to continuously receive image frames captured by the image sensor.

* * * * *